(12) United States Patent
Kim et al.

(10) Patent No.: US 9,825,541 B2
(45) Date of Patent: Nov. 21, 2017

(54) OUTPUT CURRENT ESTIMATING METHOD AND POWER SUPPLY DEVICE USING THE SAME

(71) Applicant: FAIRCHILD KOREA SEMICONDUCTOR LTD., Bucheon-si (KR)

(72) Inventors: Taesung Kim, Incheon (KR); Gwanbon Koo, Bucheon-si (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 14/597,517

(22) Filed: Jan. 15, 2015

(65) Prior Publication Data
US 2015/0204923 A1    Jul. 23, 2015

Related U.S. Application Data

(60) Provisional application No. 61/928,521, filed on Jan. 17, 2014.

(30) Foreign Application Priority Data

Dec. 29, 2014  (KR) .................. 10-2014-0192630

(51) Int. Cl.
*H02M 7/44*  (2006.01)
*H02M 3/335*  (2006.01)
*H02M 1/00*  (2006.01)
*H02M 1/34*  (2007.01)

(52) U.S. Cl.
CPC ............. *H02M 3/33523* (2013.01); *H02M 2001/0006* (2013.01); *H02M 2001/0009* (2013.01); *H02M 2001/348* (2013.01)

(58) Field of Classification Search
CPC ......... H02M 3/33592; H02M 3/33569; H02M 2001/342; H02M 1/44; Y02B 70/1433
USPC .. 363/20, 21.02, 21.08, 21.12, 21.14, 21.18, 363/56.11, 97
See application file for complete search history.

(56) References Cited

U.S. PATENT DOCUMENTS

| | | | | |
|---|---|---|---|---|
| 5,278,748 A * | 1/1994 | Kitajima | .................. | H02M 1/34 363/21.02 |
| 6,674,656 B1 * | 1/2004 | Yang | .................. | H02M 3/33523 363/21.1 |
| 7,161,816 B2 * | 1/2007 | Shteynberg | .......... | H02M 1/4258 323/282 |
| 7,310,244 B2 * | 12/2007 | Yang | ....................... | H02M 1/44 363/97 |

(Continued)

*Primary Examiner* — Rajnikant Patel
(74) *Attorney, Agent, or Firm* — Okamoto & Benedicto LLP

(57) ABSTRACT

A power supply device according to the invention includes: a power switch; a rectification diode generating an output current by rectifying a current supplied according to a switching operation of the power switch; and a switch control circuit generating an output current estimation voltage corresponding to the output current using a detection sense voltage corresponding to a sense voltage that depends on a switch current flowing to the power switch and a compensated discharge period. The compensated discharge period is a period from the peak of a discharge current flowing to the rectification diode to an instant at which the discharge current becomes zero current.

21 Claims, 7 Drawing Sheets

(56) References Cited

U.S. PATENT DOCUMENTS

| | | | | |
|---|---|---|---|---|
| 7,511,973 B2* | 3/2009 | Kesterson | .......... | H02M 3/33507 363/21.01 |
| 7,869,235 B2* | 1/2011 | Lin | .......... | H02M 1/34 363/21.18 |
| 8,199,538 B2* | 6/2012 | Piper | .......... | H02M 3/33507 363/21.13 |
| 8,391,028 B2* | 3/2013 | Yeh | .......... | H02M 3/33507 363/21.05 |
| 8,526,203 B2* | 9/2013 | Huang | .......... | H02M 3/33523 363/21.16 |
| 8,711,583 B2* | 4/2014 | Yang | .......... | H02M 1/4258 363/21.13 |
| 8,780,590 B2* | 7/2014 | So | .......... | H02M 3/33507 363/21.16 |
| 8,947,894 B2* | 2/2015 | Zhang | .......... | H02M 3/33515 363/21.12 |
| 9,024,598 B2* | 5/2015 | Hasegawa | .......... | H02M 1/32 323/225 |
| 9,431,913 B2 | 8/2016 | Kuang | | |
| 2005/0169017 A1* | 8/2005 | Muegge | .......... | H02M 3/156 363/21.15 |
| 2006/0056204 A1* | 3/2006 | Yang | .......... | H02M 3/33507 363/10 |
| 2006/0261860 A1 | 11/2006 | Yamada | | |
| 2013/0215649 A1 | 8/2013 | Huang et al. | | |
| 2013/0294117 A1* | 11/2013 | Djenguerian | .......... | G05F 1/66 363/21.15 |
| 2013/0294118 A1 | 11/2013 | So et al. | | |
| 2015/0102786 A1 | 4/2015 | Kim et al. | | |

* cited by examiner

OUTPUT CURRENT ESTIMATING METHOD AND POWER SUPPLY DEVICE USING THE SAME

CROSS-REFERENCE TO RELATED APPLICATION

This application claims priorities to and the benefits of U.S. Patent Application No. 61/928,521 filed in the USPTO on Jan. 17, 2014, and Korean Patent Application No. 10-2014-0192630, filed with the Korean Intellectual Property Office on Dec. 29, 2014, the entire contents of which are incorporated herein by reference.

BACKGROUND (a) Technical Field

Exemplary embodiments of the invention relate to an output current estimating method and a power supply device using the same.

(b) Description of the Related Art

An output current flowing to a secondary side is estimated based on a peak of a current flowing to a power switch, a discharge period during which a current flows to a rectification diode in the secondary side, and a switching cycle of the power switch. For example, the output current is estimated based on (peak of current)*(discharge period)/(switching cycle).

However, a substantial output current is reduced by a current flowing to a snubber circuit provided in a primary side. The amount of output current reduced due to the current flowing to the snubber circuit is not reflected to the equation of (peak of current)*(discharge period)/(switching cycle).

Thus, an error between the estimated output current and a substantial output current occurs.

The above information disclosed in this Background section is only for enhancement of understanding of the background of the invention and therefore it may contain information that does not form the prior art that is already known in this country to a person of ordinary skill in the art.

SUMMARY

The invention has been made in an effort to provide a method that can estimate an output current with a simple structure, and a power supply device using the same.

A power supply device according to an exemplary embodiment of the invention includes: a power switch; a rectification diode generating an output current by rectifying a current supplied according to a switching operation of the power switch; and a switch control circuit generating an output current estimation voltage corresponding to the output current using a detection sense voltage corresponding to a sense voltage that depends on a switch current flowing to the power switch and a compensated discharge period, wherein the compensated discharge period is a period from the peak of a discharge current flowing to the rectification diode to an instant at which the discharge current becomes zero current.

The switch control circuit may generate the detection sense voltage by detecting a peak of the sense voltage for every switching cycle of the power switch.

The switch control circuit may generate the detection sense voltage by calculating an average of the sense voltage for every switching cycle of the power switch.

The power supply device may further include: a primary winding coupled to the power switch; a secondary winding coupled to the rectification diode; an auxiliary winding coupled to the secondary winding in an insulated manner; and a delay voltage generator generating a delay voltage delaying an auxiliary voltage generated in the auxiliary winding during a turn-off period of the power switch.

The delay voltage generator may include: a first resistor and a second resistor coupled to the auxiliary winding; and a capacitor coupled to a first node to which the first resistor and the second resistor are coupled, and the delay voltage may be a voltage of the first node.

The switch control circuit may include a discharge period detector determining a start instant of the compensated discharge period according to a result of comparison between the delay voltage and a predetermined first reference voltage.

The discharge period detector may determine an instant at which the delay voltage rising from a turn-off instant of the power switch reaches the first reference voltage as a start instant of the compensated discharge period.

The first reference voltage may be determined by multiplying a predetermined first ratio by a maximum voltage of the delay voltage. The first ratio may be changed according to a peak of the switch current.

The discharge period detector may determine a termination instant of the compensated discharge period according to a result of comparison between the delay voltage and a predetermined second reference voltage.

The discharge period detector may determine an instant at which the delay voltage starts to decrease and then reaches the second reference voltage as the termination instant of the compensated discharge period.

The second reference voltage may be determined by multiplying a predetermined second ratio by a maximum voltage of the delay voltage.

The second ratio may be changed according to a peak of the switch current.

The power supply device may further include: a primary winding coupled to the power switch; and a snubber circuit to which a current of the primary winding flows from a turn-off instant of the power switch, wherein the switch control circuit determines a start instant of the compensated discharge period using a snubber current flowing to the snubber circuit.

The snubber circuit may include: a snubber diode of which an anode is coupled to a node to which a first end of the power switch and the primary winding are coupled; and a snubber resistor and a snubber capacitor coupled in parallel between a cathode of the snubber diode and a second end of the power switch.

The snubber circuit may include: a snubber diode of which an anode is coupled to a first end of the primary winding; and a snubber resistor and a snubber capacitor coupled in parallel between a cathode of the snubber diode and a first end of the power switch, and the first end of the power switch and a second end of the primary winding are electrically coupled, while an input voltage is supplied to a second end of the power switch.

The switch control circuit may determine an instant at which a snubber current flowing to the snubber circuit becomes zero current as a start instant of the compensated discharge period.

A method for estimating an output current may be applied to a power supply device including a power switch coupled to a primary winding and a rectification diode coupled to a secondary winding. The output current estimation method includes: detecting a compensated discharge period from an instant at which a discharge current flowing to the rectification diode reaches the peak after a turn-off instant of the power switch to an instant at which the discharge current becomes zero current; multiplying a detection sense voltage that depends on a sense voltage that corresponds to a switch current flowing to the power switch and the compensated discharge period; and dividing a result of the multiplication by a switching cycle of the power switch.

The detecting the compensated discharge period may include: generating a delay voltage by delaying an auxiliary voltage of an auxiliary winding coupled in an insulated manner with the secondary winding; and determining a start instant of the compensated discharge period by comparing the delay voltage and a predetermined first reference voltage.

The detecting the compensated discharge period may further include determining a termination instant of the compensated discharge period by comparing the delay voltage and a predetermined second reference voltage.

The detecting the compensated discharge period may include determining an instant at which a snubber current flowing from a turn-off instant of the power switch becomes zero current as a start instant of the compensated discharge period.

According to the exemplary embodiments of the invention, an output current estimation method that can estimate an output current with a simple structure, and a power supply device using the same, are provided.

DETAILED DESCRIPTION OF THE EMBODIMENTS

Figure 1:
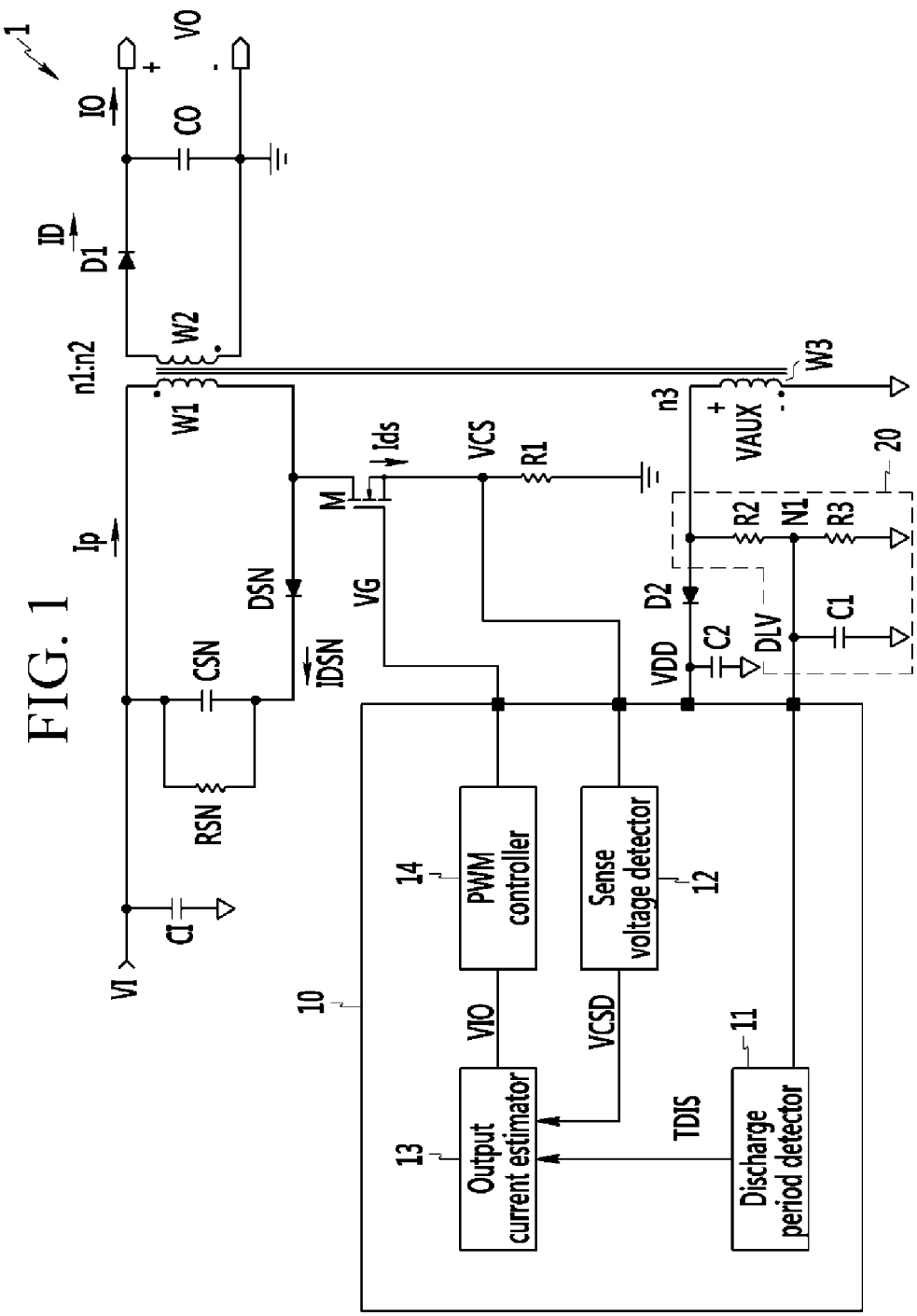
FIG. 1 shows a power supply device according to an exemplary embodiment of the invention.

In the following detailed description, only certain exemplary embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 shows a power supply device according to an exemplary embodiment of the invention.

A power supply device 1 includes a capacitor CI, a primary winding W1, a secondary winding W2, a rectification diode D1, a capacitor CO, a power switch M, a sense resistor R1, a delay voltage generator 20, and a switch control circuit 10.

The power supply device 1 may further include a snubber circuit. In FIG. 1, the snubber circuit is formed of a snubber diode DSN, a snubber capacitor CSN, and a snubber resistor RSN, but the exemplary embodiment of the invention is not limited thereto.

The snubber diode DSN includes an anode connected to a node where the primary winding W1 and a drain of the power switch M are connected. The snubber resistor RSN and the snubber capacitor CSN have a parallel connection, and are connected between an input voltage VI and a cathode of the snubber diode DSN. After the power switch M is turned off, a current IP flowing to the primary winding W1 flows through the snubber circuit for a period. The snubber diode DSN is turned on while the current IP is reduced to zero current from the turn-off time point of the power switch M. During the turn-on period of the snubber diode DSN, a snubber current IDSN flows through the snubber resistor RSN and the snubber capacitor CSN.

The capacitor CI is connected between a first end of the primary winding W1 and a primary ground.

The input voltage VI is transmitted to the first end of the primary winding W1, and the drain of the power switch M is connected to a second end of the primary winding W1. A sense resistor R1 is connected between a source of the power switch M and a ground. During a turn-on period of the power switch M, a sense voltage VCS is generated by a switch current Ids and the sense resistor R1.

A gate voltage VG is input to a gate of the power switch M. The power switch M controls power transmitted to the secondary side from the primary side. The primary side and the secondary side are insulated from each other.

The power switch M is an n-channel transistor, and therefore, a level that turns on the power switch M is high level and a level that turns off the power switch M is low level.

An anode electrode of the rectification diode D1 is connected to a first end of the secondary winding W2. When the rectification diode D1 is turned on, a discharge current ID flowing to the rectification diode D1 is transmitted to the capacitor CO and a load (not shown).

When the power switch M is turned on, a current IP flows to the primary winding and energy is stored in the primary winding W1. During this period, the rectification diode D1 is not in the turn-on state. When the power switch M is turned off and the rectification diode D1 is turned on, energy stored in the primary winding W1 is transmitted to the secondary winding W2 and the discharge current ID flows through the rectification diode D1.

An auxiliary winding W3 is provided in the primary side of the power supply device 1 shown in FIG. 1, and is electromagnetically coupled with the primary winding W1 with a predetermined turn ratio (n1:n3, turns of W1:turns of W3) and coupled in an insulated manner with the secondary winding W2 with a predetermined turn ratio (n2:n3, turns of W2:turns of W3).

During the turn-on period of the power switch M, a voltage between lateral ends of the primary winding W1 is the input voltage VI. Since a polarity of a voltage (hereinafter referred to as an auxiliary voltage, VAUX) between lateral ends of the auxiliary winding W3 is opposite to the voltage between lateral ends of the primary winding W1, the auxiliary voltage VAUX of the auxiliary winding W3 is −n13*Vin(n13=n3/n1) during the turn-on period.

During a turn-off period of the power switch M, the voltage between lateral ends of the primary winding W1 is a negative voltage, which is proportional to the output voltage VO, and the auxiliary voltage VAUX is a positive voltage n23*VO(n23=n3/n2), which is proportional to the output voltage VO during the turn-off period.

The diode D2 rectifies a current flowing to the auxiliary winding W3, and the capacitor C2 is charged by the current flowing through the diode D2 such that a power voltage VDD is generated. The power voltage VDD is a voltage required for operating the switch control circuit 10.

The delay voltage generator 20 generates a delay voltage DLV using the auxiliary voltage VAUX so as to detect a period during which the snubber current IDSN is generated. For example, the delay voltage generator 20, which is a delay circuit having a predetermined time constant, generates the delay voltage DLV by delaying rising and falling of the auxiliary voltage VAUX.

From the turn-off instant of the power switch M, the snubber current IDSN is generated and is then decreased to zero current. The auxiliary voltage VAUX is increased to a positive voltage that is proportional to the output voltage VO at the turn-off instant of the power switch M. In the present exemplary embodiment, a first period during which the snubber current IDSN flows is not detected but a second period during which the delay voltage DLV starts to increase along the auxiliary voltage VAUX and then reaches a predetermined reference voltage is detected. The first period and the second period may match each other by setting the reference voltage appropriately. Alternatively, first period and the second period may match each other by appropriately setting the time constant of the delay voltage generator 20.

The first period is determined according to the snubber circuit, and therefore the reference voltage may be set accordingly during controller design. For example, the reference voltage VR1 (refer to FIG. 2) may be set to a voltage a*VM, which is acquired by multiplying a predetermined ratio(a) by a maximum voltage VM of the delay voltage DLV. That is, the ratio(a) may be adjusted to set the reference voltage for matching the first period and the second period. In this case, the maximum voltage VM corresponds to the output voltage VO, and thus when the output voltage VO is changed, the reference voltage VR1 may be changed according to the maximum voltage VM.

In addition, the ratio(a) may be changed according to a peak of the switch current Ids. When the peak of the switch current Ids is changed, the first period is changed. For example, when the peak of the switch current Ids is increased, the first period is increased, and when the peak of the switch current Ids is decreased, the first period is decreased. Thus, the predetermined ratio(a) determined by the snubber circuit needs to be changed. That is, when the peak of the switch current Ids is increased, the ratio(a) is increased, and when the peak of the switch current Ids is decreased, the ratio(a) is decreased.

One of factors that change the peak of the switch current Ids is a change in the input voltage VI. Thus, when the input voltage VI is changed, the ratio(a) is changed according to the input voltage VI. For example, when the input voltage VI is increased, a rising slope of the switch current Ids is increased so that the peak may be increased. On the contrary, when the input voltage VI is decreased, the rising slope of the switch current Ids is decreased so that the peak may be decreased. Thus, when the input voltage VI is increased, the ratio(a) is increased, and when the input voltage VI is decreased, the ratio(a) is decreased. In the exemplary embodiment shown in FIG. 1, the delay voltage DLV is generated using the auxiliary voltage VAUX to detect the first period, but the invention is not limited thereto.

The delay voltage generator 20 includes two resistors R2 and R3 and a capacitor C1. The two resistors R2 and R3 are serially connected between a first end of the auxiliary winding W3 and the primary ground, and the capacitor C1 is connected between a node N1 to which the two resistors R2 and R3 are connected and the primary ground. Then, the delay voltage DLV that depends on a time constant C1*(R2*R3/(R2+R3)) is generated in the node N1.

The delay voltage generator 20 shown in FIG. 1 is an example, and the present exemplary embodiment is not limited thereto. The delay voltage generator 20 may be implemented by various circuits that can generate a delay voltage having a predetermined time constant by using the auxiliary voltage VAUX.

The switch control circuit 10 controls switching operation of the power switch M using an estimation voltage of the output current IO. The switch control circuit 10 detects a discharge period using the delay voltage DLV and a sense voltage VCS, and generates an estimation voltage (hereinafter referred to as an output current estimation voltage VIO) by using the discharge period and the sense voltage VCS. The switch control circuit 10 generates a gate voltage VG that controls the switching operation of the power switch M according to the output current estimation voltage VIO.

The output current IO is determined according to a result of integration of the discharge current ID flowing through the rectification diode D1 for a discharge period. The discharge period implies a period while the rectification diode D1 is turned on and the discharge current ID flows through the rectification diode D1. The discharge current ID flowing through the rectification diode D1 during the turn-off period of the power switch M is a triangle waveform generated during the discharge period from the turn-off period of the power switch M.

The secondary side current generated at the turn-off instant of the power switch M is determined according to the peak of the switch current Ids (or an average of the switch current Ids). Thus, the output current IO depends on a result of multiplication of the discharge period to the peak (or the average) of the switch current Ids. Since the sense voltage VCS is determined by the switch current Ids, the output current IO can be estimated as given in Equation 1.

Output current $(IO) = k*(\text{peak of } VCS)*(\text{discharge period})/(\text{switching cycle of power switch})$ [Equation 1]

Here, the average of VCS may be used instead of using the peak of VCS. k is a proportional constant and is appropriately set according to a design, and for example, the value of k may be set to be different when using the peak of VCS and when using the average of VCS.

The switch control circuit 10 includes a discharge period detector 11, a sense voltage detector 12, an output current estimator 13, and a PWM controller 14.

The discharge period detector 11 detects a discharge period start time according to a result of comparison between the delay voltage DLV and the reference voltage VR1. The discharge period detector 11 may detect a time from which the auxiliary voltage VAUX starts to decrease during the turn-off period of the power switch M as a discharge period end time. The discharge period detector 11 detects a time at which the delay voltage DLV starting to increase from the turn-off instant of the power switch M reaches the reference voltage VR1 as the discharge period start time. The discharge period detector 11 may generate a discharge period signal TDIS having high level during the discharge period.

The sense voltage detector 12 detects a peak of the sense voltage VCS for every switching cycle. Alternatively, the sense voltage detector 12 may detect an average of the sense voltage VCS during the turn-on period for every switching cycle. The peak or the average of the sense voltage VCS may be information on the sense voltage VCS that is generated for every switching cycle, and may also be information on the switch current Ids. The sense voltage detector 12 detects a detection sense voltage VCSD according to the detected peak or average.

The output current estimator 13 multiplies a high-level period of the discharge period signal TDIS by the detection sense voltage VCSD, and generates an output current estimation voltage VIO by dividing the multiplication result by the switching cycle of the power switch M.

The PWM controller 14 generates a gate voltage VG that controls the switching operation of the power switch M according to the output current estimation voltage VIO. For example, the PWM controller 14 generates a compensation voltage according to a difference between the output current estimation voltage VIO and a predetermined reference voltage, and determines a turn-on period of the power switch M according to a result of comparison between the compensation voltage and the sense voltage VCS or between the compensation voltage and a triangle wave generated inside the switch control circuit 10.

Hereinafter, an output current estimation operation according to the exemplary embodiment of the invention will be described with reference to FIG. 2.

Figure 2:
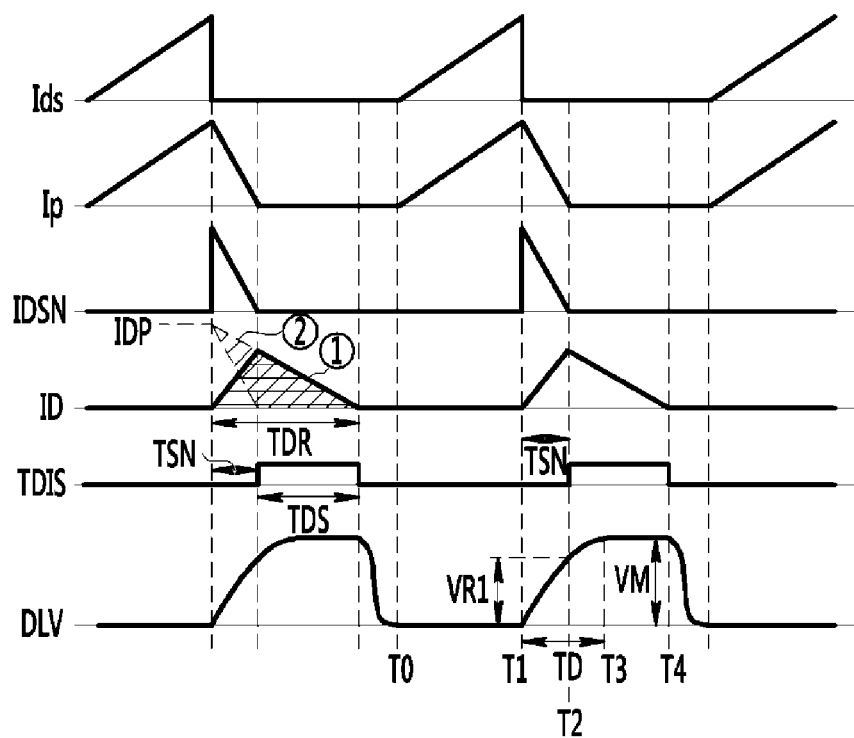
FIG. 2 is a waveform diagram of a switch current, a primary side current, a snubber current, a discharge current, a discharge period signal, and a delay voltage according to the exemplary embodiment of the invention.

FIG. 2 is a waveform diagram of the switch current, the primary-side current, the snubber current, the discharge current, the discharge period signal, and the delay voltage according to the exemplary embodiment of the invention.

In FIG. 2, TDR is a period during which the discharge current ID is substantially generated. However, in the exemplary embodiment, a period obtained by subtracting a period TSN during which the snubber current IDSN flows from the period TDR may be set as the discharge period. This is because that an area marked by triangle 1 and area marked by triangle 2 are equivalent to each other.

Figure 3:
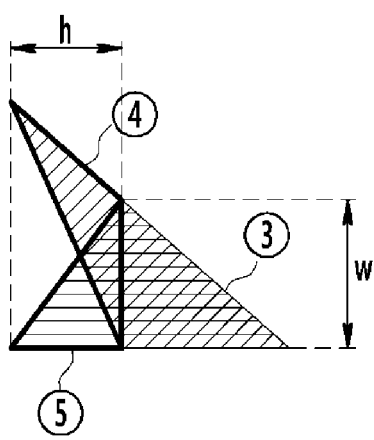
FIG. 3 illustrates a comparison between triangle 1 and triangle 2.

FIG. 3 shows a comparison between triangle 1 and triangle 2.

As shown in FIG. 3, triangle 1 and triangle 2 share an area of triangle 3, and a bottom side w and a height h of triangle 4 are the same as those of triangle 5, and therefore they have the same area. Therefore, the area of triangle 1 and the area of triangle 2 are equivalent to each other.

Since the output current IO depends on a result of integration of the discharge current during the discharge period and the area of triangle 1 and the area of triangle 2 have the same area, the discharge period may be set as TDS rather than the substantial discharge period TDR in the exemplary embodiment of the invention. Hereinafter, the period TDS is referred to as a compensated discharge period. The compensated discharge period corresponds to a period from an instant at which the discharge current ID reaches the peak to an instant at which the discharge current ID becomes zero.

As described, when using the compensated discharge period TDS instead of using the substantial discharge period TDR, the output current can be estimated only using information on the primary side. In order to estimate the output current IO using the substantial discharge period TDR, a substantial peak of the discharge current ID at the secondary side needs to be detected. However, when using the compensated discharge period TDS, the output current IO can be estimated using the peak or the average of the switch current Ids.

Power based on as much as the switch current Ids flowing during the turn-on period of the power switch M is transmitted to the secondary side, and the peak of the discharge current ID is determined according to power transmitted to the secondary side. Ideally, when the discharge current ID is rapidly increased and thus reaches the peak at the turn-off instant T1 of the power switch M, the output current IO depends on multiplication of the substantial discharge period TDR and the peak of the ideal discharge current ID.

However, as shown in FIG. 2, substantially, power transmission loss occurs due to snubber current IDSN and accordingly the peak of the discharge current ID is decreased. The waveform of the discharge current ID shown in FIG. 2 is increased for a period TSN during which the snubber current IDSN flows and then reaches the peak after the period TSN has passed. In order to estimate the output current IO, the area of triangle 1 needs to be calculated, and a configuration for sensing the discharge current ID needs to be formed in the secondary side in order to acquire a substantial peak of the discharge current ID.

As previously described, the area determined by the substantial discharge period TDR and the peak of the substantial discharge current and the area determined by the peak of the ideal discharge current ID and the compensated discharge period TDS are equivalent to each other, and therefore the output current can be estimated only using information on the primary side according to the exemplary embodiment of the invention. In FIG. 2, the peak of the ideal discharge current ID is denoted as IDP.

The peak IDP of the ideal discharge current ID is determined according to the peak or average of the switch current Ids, and therefore, the detection sense voltage VCSD corresponds to the peak IDP. In addition, the compensated discharge period TDS may be detected by using the delay voltage DLV. As described, in the exemplary embodiment of the invention, the output current IO can be estimated using the detection sense voltage VCDS and the compensated discharge period TDS.

In detail, the power switch M is turned on at T0 and the switch current Ids starts to flow. At T1, the power switch M is turned off and thus the switch current Ids becomes zero. The snubber current IDSN is rapidly increased at T1 and is decreased during the period TSN.

The delay voltage DLV starts to increase from T1. The delay voltage DLV reaches the reference voltage VR1 at T2. A period T1 to T2 equals the period TSN. The discharge period signal TDIS becomes high level at T2. The discharge current ID becomes zero at T4 and an auxiliary voltage VAUX starts to decrease. At T4, the discharge period signal TDIS becomes low level.

The increasing delay voltage DLV reaches the maximum voltage VM at T3, and the period TD, which is a period during which the delay voltage DLV reaches the maximum voltage VM, is determined by the above-stated time constant.

In the previous exemplary embodiment, only the start instant of the compensated discharge period TDS is detected using the delay voltage DLV, but the exemplary embodiment is not limited thereto. In another exemplary embodiment of the invention, a termination instant of the compensated discharge period TDS can be detected using the delay voltage DLV.

Figure 4:
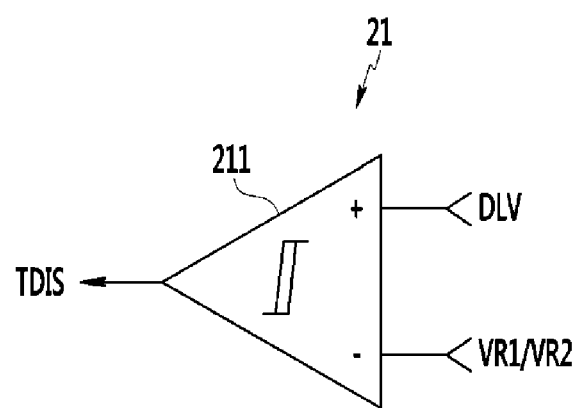
FIG. 4 shows a configuration of a discharge period detector according to another exemplary embodiment of the invention.

FIG. 4 shows a configuration of a discharge period detector according to another exemplary embodiment of the invention.

As shown in FIG. 4, a discharge period detector 21 includes a hysteresis comparator 211. The hysteresis comparator 211 changes a discharge period signal TDIS to high level according to a comparison result of a reference voltage VR1 and a delay voltage DLV when a delay voltage DLV is increased, and changes the discharge period signal TDIS to low level according to a comparison result of a reference voltage VR2 and the delay voltage DLV when the delay voltage DLV is decreased.

The reference voltage VR2 may be set as a value acquired by multiplying a predetermined ratio(b) by a maximum voltage VM of the delay voltage DLV. Like the ratio(a), a ratio(b) may be changed according to a peak of the switch current Ids or an input voltage VI.

The hysteresis comparator 211 includes a non-inversion terminal (+) to which the delay voltage DLV is input and an inversion terminal (−) where the reference voltage VR1 and the reference voltage VR2 are provided. The hysteresis comparator 211 changes the discharge period signal TDIS to high level at an instant that the delay voltage DLV reaches the reference voltage VR1 when the delay voltage DLV is increasing, and changes the discharge period signal TDIS to low level at an instant that the delay voltage DLV reaches the reference voltage VR2 when the delay voltage DLV is decreasing.

Figure 5:
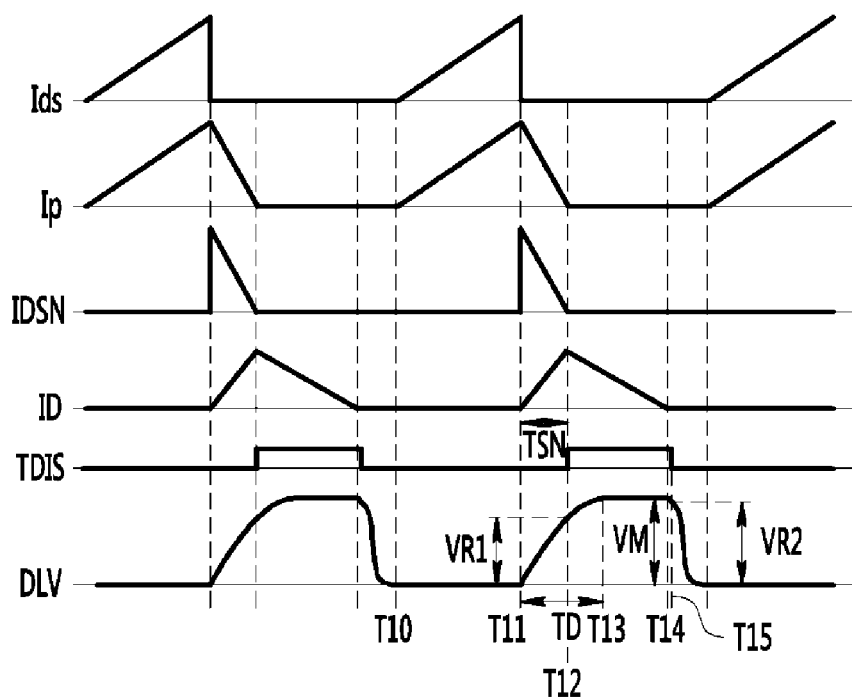
FIG. 5 is a waveform diagram of a switch current, a primary side current, a snubber current, a discharge current, a discharge period signal, and a delay voltage according to another exemplary embodiment of the invention.

FIG. 5 is a waveform diagram of a switch current, a primary-side current, a snubber current, a discharge current, a discharge period signal, and a delay voltage according to another exemplary embodiment of the invention.

As shown in FIG. 5, the power switch M is turned on and thus the switch current Ids starts to flow at T10. At T11, the power switch M is turned off and thus the switch current Ids becomes zero. A snubber current IDSN is rapidly increased at T11 and decreased during a period TSN.

The delay voltage DLV starts to increase from T11. The delay voltage DLV reaches the reference voltage VR1 at T12. A period T11 to T12 is equivalent to the period TSN. The discharge period signal TDIS becomes high level at T12.

The increasing delay voltage DLV reaches the maximum voltage VM at T13. At T14, the discharge current ID becomes zero current and an auxiliary voltage VAUX starts to decrease.

At T15 delayed for a predetermined time period from T14, the delay voltage DLV is decreased to the reference voltage VR2 and the discharge period signal TDIS becomes low level.

In the previous exemplary embodiment of the invention, a start time of a compensated discharge period is detected using the delay voltage DLV based on the auxiliary voltage VAUX, and in the present exemplary embodiment of the invention, a termination time of the compensated discharge period is additionally detected using the delay voltage DLV. However, the invention is not limited thereto. The start time of the compensated discharge period can be detected by directly sensing a snubber current instead of detecting the delay voltage DLV.

Figure 6:
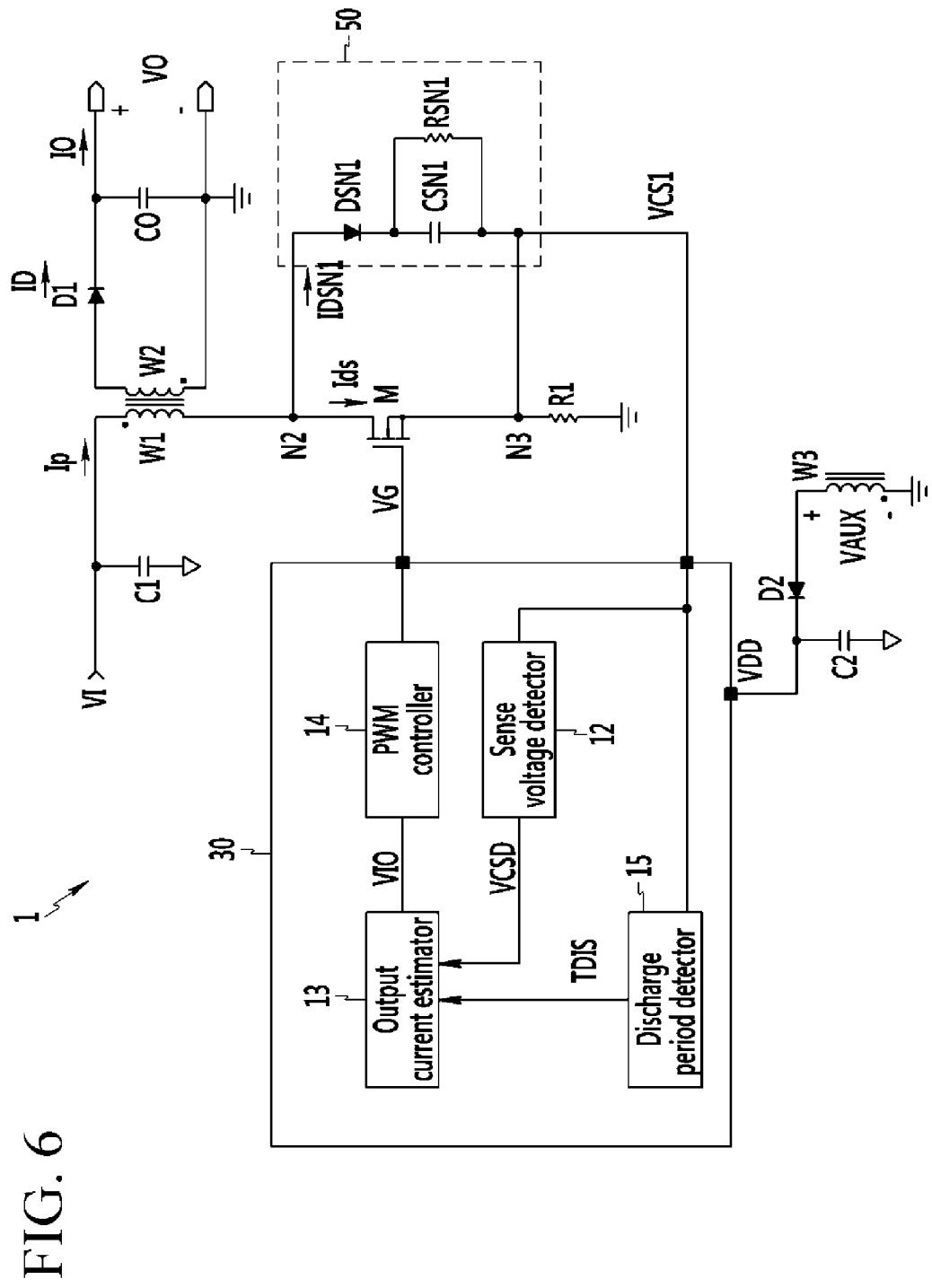
FIG. 6 shows a power supply device according to another exemplary embodiment of the invention.

FIG. 6 shows a power supply device according to another exemplary embodiment of the invention.

A configuration that is the same as that of the previous exemplary embodiment will not be described.

Unlike the snubber circuit in the previous exemplary embodiments, a snubber circuit 50 is connected between lateral ends of a power switch M. A snubber current IDSN1 having passed through the snubber circuit 50 flows through a sense resistor R1. Then, the sense voltage VCS1 is generated not only during a turn-on period of the power switch M but also for a period during which the snubber current IDSN1 flows.

The snubber circuit 50 includes a snubber diode DSN1, a snubber resistor RSN1, and a snubber capacitor CSN1. An anode of the snubber diode DSN1 is connected to a node N2 to which a drain of the power switch M and a primary winding W1 are connected. The snubber capacitor CSN1 and the snubber resistor RSN1 are connected in parallel between a cathode of the snubber diode DSN1 and a node N3. The node N3 is a node where a source of the power switch M and a first end of the sense resistor R1 are connected. The sense voltage VCS1 is a voltage of the node N3.

The sense voltage VCS1 depends on a switch current Ids flowing to the power switch M during the turn-on period of the power switch M. When the power switch M is turned off, the snubber diode DSN1 is turned on and thus the snubber current IDSN1 flows. The snubber current IDSN1 flows to the sense resistor R1 through the snubber resistor RSN1 and the snubber capacitor CSN1. The sense voltage VCS1 is generated while the snubber current IDSN1 flows through the sense resistor R1. When the snubber current IDSN1 becomes zero current, the snubber diode DSN1 is turned off and the sense voltage VCS1 becomes zero voltage.

A switch control circuit 30 according to the present exemplary embodiment detects an instant at which the sense voltage VCS1 becomes zero voltage after turn-off of the power switch M as a start instant of a compensated discharge period.

A sense voltage detector 12 of the switch control circuit 30 generates a detection sense voltage VCSD by detecting a peak of the sense voltage VCS1 for every switching cycle of the power switch M or calculating an average of the sense voltage VCS1 during the turn-on period of the power switch M.

The discharge period detector 15 detects an instant at which the sense voltage VCS1 becomes zero voltage after turn-off of the power switch M as a start instant of the compensated discharge period. The discharge period detector 15 may detect an instant at which an auxiliary voltage VAUX, which is a voltage between lateral ends of an auxiliary winding W3, starts to decrease during a turn-off period of the power switch M as a termination instant of the compensated discharge period. An instant at which an output voltage VO reflected to lateral ends of the auxiliary winding W3 starts to decrease is equivalent to a turn-off instant of a rectification diode D1.

Figure 7:
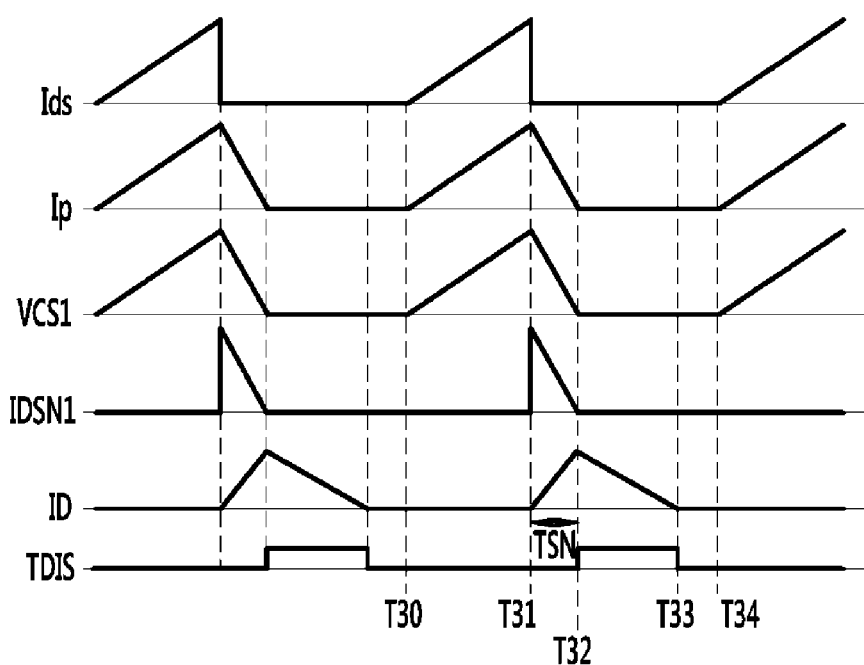
FIG. 7 shows a switch current, a primary side current, a snubber current, a discharge current, and a discharge period signal according to another exemplary embodiment of the invention shown in FIG. 6.

FIG. 7 shows the switch current, the primary-side current, the snubber current, the discharge current, and the discharge period signal according to the present exemplary embodiment.

As shown in FIG. 7, the power switch M is turned on and the switch current Ids starts to flow at T30. At T31, the power switch M is turned off and thus the switch current Ids becomes zero. The snubber current IDSN1 is rapidly increased at T31 and decreased during a period TSN. The decreasing snubber current IDSN1 becomes zero current at T32.

The sense voltage VCS1 is increased according to the switch current Ids during a turn-on period (i.e., T30 to T31) of the power switch M. The sense voltage VCS1 is decreased for a period T31 to T32 during which the snubber current IDSN1 flows during the turn-off period of the power switch M.

The discharge period detector 15 changes the discharge period signal TDIS to high level at T32 at which the sense voltage VCS1 becomes zero voltage.

The discharge current ID is increased for a period TSN during which the snubber current IDSN1 flows, and is decreased from T32 and then becomes zero current at T33. Then, the auxiliary voltage VAUX starts to decrease and the discharge signal TDIS becomes low level.

As described, the compensated discharge period can be precisely detected by sensing the snubber current in the present exemplary embodiment. The invention is not limited to the snubber circuit shown in FIG. 6. Numerous variations that can detect a start instant of a compensated discharge period by using a snubber current are applicable.

Figure 8:
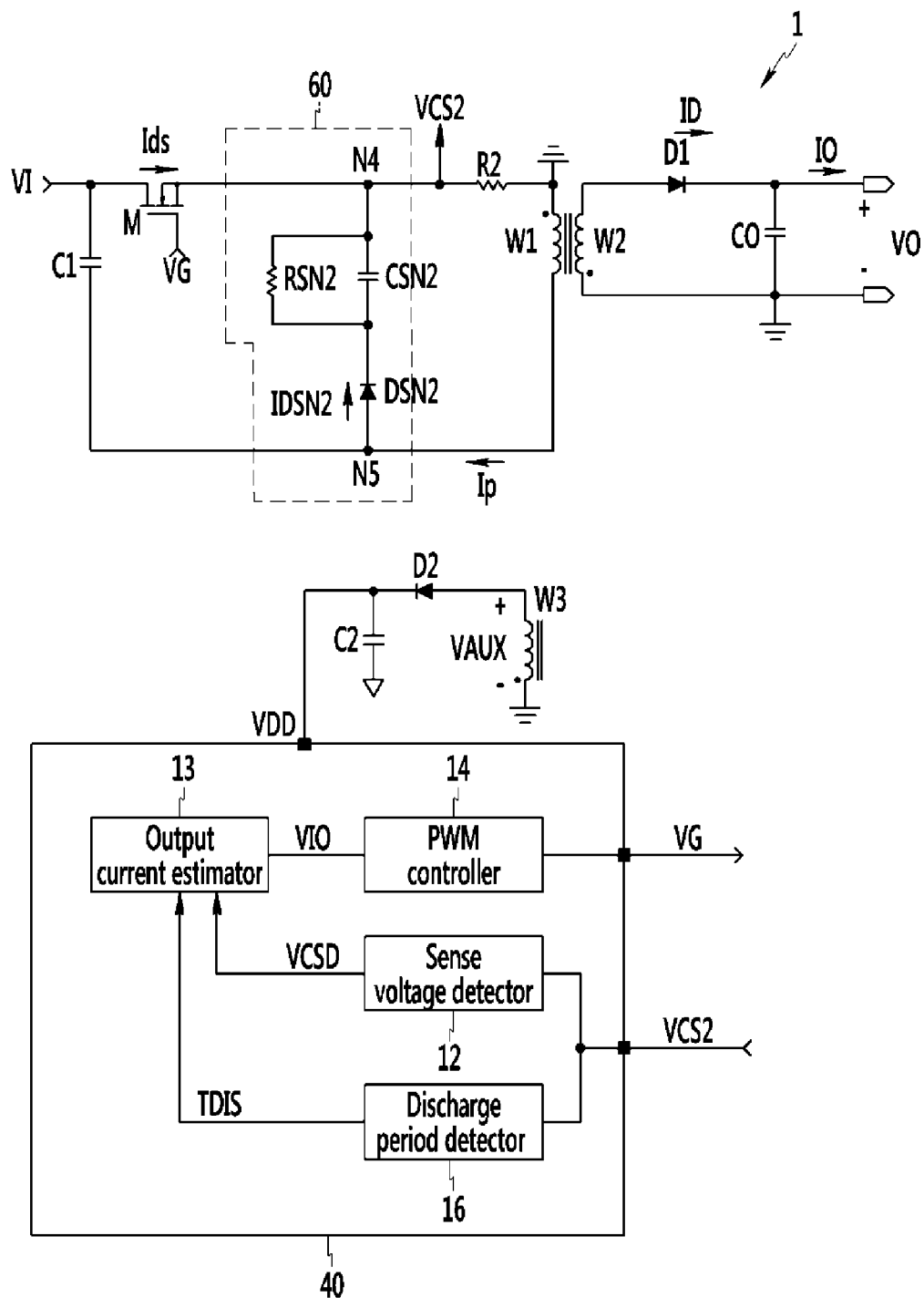
FIG. 8 shows a power supply device according to another exemplary embodiment of the invention.

FIG. 8 shows a power supply device according to another exemplary embodiment of the invention.

As shown in FIG. 8, an input voltage VI is input to a drain of a power switch M, and a source of the power switch M is connected to a first end of a sense resistor R2. A second end of the sense resistor R2 is connected to a first end of a primary winding W1 and a primary-side ground.

A snubber circuit 60 is connected in parallel with lateral ends of the primary winding W1.

The snubber circuit 60 includes a snubber diode DSN2, a snubber resistor RSN2, and a snubber capacitor CSN2. An anode of the snubber diode DSN2 is connected to a node N5 to which a second end of the primary winding W1 and a second electrode of a capacitor CI are connected. The snubber capacitor CSN2 and the snubber resistor RSN2 are connected in parallel between a cathode of the snubber diode DSN2 and a node N4. The node N4 is a node to which the source of the power switch M and a first end of the sense resistor R2 are connected. The sense voltage VCS2 is a voltage of the node N4.

The sense voltage VCS2 depends on the switch current Ids flowing to the power switch M during a turn-on period of the power switch M. When the power switch M is turned off, the snubber diode DSN2 is turned on and thus the snubber current IDSN2 flows. The snubber current IDSN2 flows to the sense resistor R2 through the snubber resistor RSN2 and the snubber capacitor CSN2. The sense voltage VCS2 is generated while the snubber current IDSN2 flows through the sense resistor R2. When the snubber current IDSN2 becomes zero current, the snubber diode DSN2 is turned off and the sense voltage VCS2 becomes zero voltage.

Like the switch control circuit 30 according to the exemplary embodiment shown in FIG. 7, a switch control circuit 40 according to the exemplary embodiment shown in FIG. 8 detects an instant at which the sense voltage VCS2 becomes zero voltage after turn-off of the power switch M as a start instant of a compensated discharge period.

A sense voltage detector 12 of the switch control circuit 40 generates a detection sense voltage VCSD by detecting a peak of the sense voltage VCS2 for every switching cycle of the power switch M or calculating an average of the sense voltage VCS2 during a turn-on period of the power switch M.

The discharge period detector 16 detects an instant at which the sense voltage VCS2 becomes zero voltage after turn-off of the power switch M as a start instant of the compensated discharge period. The discharge period detector 16 may detect an instant at which an auxiliary voltage VAUX starts to decrease during the turn-off period of the power switch M as a termination instant of the compensated discharge period.

As described, in the exemplary embodiments of the invention, an output current can be precisely estimated by using the compensated discharge period during which the discharge current becomes zero current from the peak of the discharge current instead of using a substantial discharge period during which the discharge current flows through the rectification diode. Then, the output current according to the power substantially transmitted to the secondary side can be precisely estimated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: power supply device
20: delay voltage generator
10, 30, 40: switch control circuit
11, 21, 15, 16: discharge period detector
12: sense voltage detector
13: output current estimator
50, 60: snubber circuit
14: PWM controller

What is claimed is:

1. A power supply device comprising:
   a power switch;
   a rectification diode configured to generate an output current by rectifying a current supplied according to a switching operation of the power switch; and
   a switch control circuit configured to generate an output current estimation voltage corresponding to the output current using a detection sense voltage corresponding to a sense voltage that depends on a switch current flowing to the power switch and a compensated discharge period,
   wherein the compensated discharge period is a period from the peak of a discharge current flowing to the rectification diode to an instant at which the discharge current becomes zero current, and the peak of the discharge current occurs when a snubber current flowing to a snubber circuit has decreased to zero current.

2. The power supply device of claim 1, wherein the switch control circuit generates the detection sense voltage by detecting a peak of the sense voltage for every switching cycle of the power switch.

3. The power supply device of claim 1, wherein the switch control circuit generates the detection sense voltage by calculating an average of the sense voltage for every switching cycle of the power switch.

4. The power supply device of claim 1, further comprising:
   a primary winding coupled to the power switch;
   a secondary winding coupled to the rectification diode;
   an auxiliary winding coupled to the secondary winding in an insulated manner; and
   a delay voltage generator configured to generate a delay voltage delaying an auxiliary voltage generated in the auxiliary winding during a turn-off period of the power switch.

5. The power supply device of claim 4, wherein the delay voltage generator comprises:
   a first resistor and a second resistor coupled to the auxiliary winding;
   a capacitor coupled to a first node to which the first resistor and the second resistor are coupled, wherein the delay voltage is a voltage of the first node.

6. The power supply device of claim 4, wherein the switch control circuit comprises a discharge period detector configured to determine a start instant of the compensated discharge period according to a result of comparison between the delay voltage and a predetermined first reference voltage.

7. The power supply device of claim 6, wherein the discharge period detector determines an instant at which the delay voltage rising from a turn-off instant of the power switch reaches the first reference voltage as a start instant of the compensated discharge period.

8. The power supply device of claim 6, wherein the first reference voltage is determined by multiplying a predetermined first ratio by a maximum voltage of the delay voltage.

9. The power supply device of claim 8, wherein the first ratio is changed according to a peak of the switch current.

10. The power supply device of claim 6, wherein the discharge period detector is further configured to determine a termination instant of the compensated discharge period according to a result of comparison between the delay voltage and a predetermined second reference voltage.

11. The power supply device of claim 10, wherein the discharge period detector determines an instant at which the delay voltage starts to decrease and then reaches the second reference voltage as the termination instant of the compensated discharge period.

12. The power supply device of claim 10, wherein the second reference voltage is determined by multiplying a predetermined second ratio by a maximum voltage of the delay voltage.

13. The power supply device of claim 12, wherein the second ratio is changed according to a peak of the switch current.

14. The power supply device of claim 1, further comprising:
   a primary winding coupled to the power switch,
   wherein a current of the primary winding flows to the snubber circuit from a turn-off instant of the power switch, wherein the switch control circuit determines a start instant of the compensated discharge period using the snubber current flowing to the snubber circuit.

15. The power supply device of claim 14, wherein the snubber circuit comprises:
   a snubber diode of which an anode is coupled to a node to which a first end of the power switch and the primary winding are coupled; and
   a snubber resistor and a snubber capacitor coupled in parallel between a cathode of the snubber diode and a second end of the power switch.

16. The power supply device of claim 14, wherein the snubber circuit comprises:
   a snubber diode of which an anode is coupled to a first end of the primary winding; and
   a snubber resistor and a snubber capacitor coupled in parallel between a cathode of the snubber diode and a first end of the power switch, wherein the first end of the power switch and a second end of the primary winding are electrically coupled, while an input voltage is supplied to a second end of the power switch.

17. The power supply device of claim 14, wherein the switch control circuit is configured to determine an instant at which the snubber current flowing to the snubber circuit becomes zero current as a start instant of the compensated discharge period.

18. A method for estimating an output current of a power supply device including a power switch coupled to a primary winding and a rectification diode coupled to a secondary winding, comprising:
   detecting a compensated discharge period from an instant at which a discharge current flowing to the rectification diode reaches a peak after a turn-off instant of the power switch to an instant at which the discharge current becomes zero current, wherein the peak of the discharge current occurs when a snubber current flowing to the snubber circuit has decreased to zero current;
   multiplying the compensated discharge period by a detection sense voltage that depends on a sense voltage that corresponds to a switch current flowing to the power switch; and
   dividing a result of the multiplication by a switching cycle of the power switch.

19. The method of claim 18, wherein detecting the compensated discharge period comprises:
   generating a delay voltage by delaying an auxiliary voltage of an auxiliary winding coupled in an insulated manner to the secondary winding; and
   determining a start instant of the compensated discharge period by comparing the delay voltage and a predetermined first reference voltage.

20. The method of claim 19, wherein detecting the compensated discharge period further comprises determining a termination instant of the compensated discharge period by comparing the delay voltage and a predetermined second reference voltage.

21. The method of claim 18, wherein the detecting the compensated discharge period comprises determining a start instant of the compensated discharge period to be an instant at which the snubber current flowing from the turn-off instant of the power switch becomes zero current.

* * * * *